US007686858B2

(12) United States Patent
Oh

(10) Patent No.: US 7,686,858 B2
(45) Date of Patent: Mar. 30, 2010

(54) CYCLONE DUST COLLECTION APPARATUS

(75) Inventor: Jang-keun Oh, Gwangju (KR)

(73) Assignee: Samsung Gwangju Electronics Co., Ltd., Gwangu (KR)

( * ) Notice: Subject to any disclaimer, the term of this patent is extended or adjusted under 35 U.S.C. 154(b) by 926 days.

(21) Appl. No.: 11/408,751

(22) Filed: Apr. 21, 2006

(65) Prior Publication Data

US 2007/0079582 A1 Apr. 12, 2007

(30) Foreign Application Priority Data

Oct. 10, 2005 (KR) ...................... 10-2005-0095101

(51) Int. Cl.
*B01D 45/12* (2006.01)

(52) U.S. Cl. ............................ 55/345; 55/337; 55/346; 55/459.12; 55/459.2; 55/DIG. 3; 55/343; 55/348; 55/349; 15/353

(58) Field of Classification Search .................. 55/345, 55/346, 343, 348, 459.1, 459.2, 349, DIG. 3, 55/337; 15/353
See application file for complete search history.

(56) References Cited

U.S. PATENT DOCUMENTS

| | | | | |
|---|---|---|---|---|
| 3,413,776 | A * | 12/1968 | Vytlacil | 95/271 |
| 3,925,044 | A * | 12/1975 | Tu et al. | 55/337 |
| 5,135,552 | A | 8/1992 | Weistra | 55/337 |
| 6,042,628 | A | 3/2000 | Nishikiori et al. | 55/337 |
| 2004/0069705 | A1 | 4/2004 | Tuszko et al. | 210/512.1 |
| 2005/0252180 | A1 * | 11/2005 | Oh et al. | 55/345 |

FOREIGN PATENT DOCUMENTS

| | | |
|---|---|---|
| EP | 1707095 | 10/2006 |
| GB | 2372435 | 8/2002 |
| GB | 2372468 | 8/2002 |
| GB | 2372469 | 8/2002 |
| GB | 2374305 | 10/2002 |
| KR | 1020030062520 | 7/2003 |
| KR | 2003-0081443 | 10/2003 |
| WO | WO02/067755 | 9/2002 |
| WO | WO/02067756 | 9/2002 |

OTHER PUBLICATIONS

Office Action dated Jul. 18, 2008 corresponding to Australian Patent Application No. 2006201989.

Official action dated Jul. 6, 2007 from corressponding Russian Patent Application No. 2006117993.

* cited by examiner

*Primary Examiner*—Robert J Hill, Jr.
*Assistant Examiner*—Dung Bui
(74) *Attorney, Agent, or Firm*—Ohlandt, Greeley, Ruggiero & Perle, L.L.P.

(57) ABSTRACT

Disclosed is a cyclone dust collection apparatus. The cyclone apparatus comprises a cyclone body having a first cyclone section and a plurality of cyclone cones arranged around a lower part of the first cyclone, each cyclone cone having a conical shape whose diameter is reduced as approaching the top end thereof; a top cover joined to the top end of the cyclone body and formed with a helical air inflow duct for introducing ambient air into the first cyclone section; an inflow/outflow guide cover joined to the lower end of the cyclone body so as to communicate the first cyclone section and the plurality of cyclone cones; and a discharge cover joined to the lower part of the inflow/outflow guide cover so as to collect the air discharged through the inflow/outflow guide cover and discharge the collected air to the outside of the cyclone dust collection apparatus.

11 Claims, 6 Drawing Sheets

CYCLONE DUST COLLECTION APPARATUS

CROSS-REFERENCE TO RELATED APPLICATIONS

This application claims the benefit of Korean Patent Application No. 2005-95101 filed on Oct. 10, 2005 with the Korean Intellectual Property Office, the disclosure of which is incorporated herein by reference.

BACKGROUND OF THE INVENTION

1. Field of the Invention

The present invention relates to a vacuum cleaner. In particular, the present invention relates to a cyclone dust collection apparatus, which is employed in a vacuum cleaner so as to filter dust suctioned from a surface together with air, using centrifugal force.

2. Description of the Related Art

In general, a vacuum cleaner comprises a bottom brush for suctioning dust from a surface together with air, a motor driving chamber provided with a driving source, and a vacuum cleaner body provided with a cyclone collection apparatus.

The cyclone collection apparatus is constructed in such a way that dust-entrained air, which is introduced from the bottom brush, is caused to form a swirling stream so that dust is separated from the air by centrifugal force, the dust is collected, and clean air is discharged into the motor driving chamber. In recent years, in order to improve dust collection efficiency, there has been proposed a cyclone dust collection apparatus that separates dust entrained in the air over two or more steps, wherein such a cyclone dust collection apparatus comprises one or more secondary cyclones.

The above-mentioned types of conventional cyclone dust collection apparatus are disclosed in WO02/067755 and WO02/067756 (Dyson Ltd). However, such conventional multi-clone dust collection apparatus has a disadvantage in that that because an upstream cyclone (a first cyclone), and a downstream cleaner (a second cyclone) are vertically arranged, thereby increasing the entire height of the dust-collection apparatus, they are mainly applied to an upright type cleaner but hard to be applied to a canister-type cleaner.

In order to solve the above problems, as disclosed in Korean Patent Application No. 2003-62520, it was possible to reduce the overall height of a cyclone dust collection apparatus by arranging second cyclones around the periphery of a first cyclone. However, efforts for reducing heights of dust collection apparatus have been continued so as to miniaturize cleaners. In addition, there was a need to reduce a flow path from an air outflow port, which is located above the top ends of the second cyclones of the dust collection apparatus, to a motor driving chamber, which is provided on the bottom of a cleaner so as to improve a pipe pressure loss.

Furthermore, in order to decrease the amount of dust that collects on a downstream part of the air flow path between the outlet of the first cyclone and the inlets of the second cyclones, where it is difficult for a user to clean, there is a need to increase the fine dust collection efficiency in the first cyclone.

SUMMARY OF THE INVENTION

Accordingly, the present invention has been made to solve the above-mentioned problems occurring in the prior art, and an object of the present invention is to provide a cyclone dust collection apparatus, wherein an air flow path for air discharged from the cyclone dust collection apparatus to a motor driving chamber is reduced so as to decrease a loss in suction force.

Another object of the invention is to provide a cyclone dust collection apparatus having a first cyclone which is improved in fine dust collection efficiency so as to enhance a convenience in using the cyclone dust collection apparatus.

Still another object of the invention is to provide a cyclone dust collection apparatus, the overall height of which is reduced so as to be applicable to a small-sized cleaner.

In order to achieve the above-mentioned objects, there is provided a cyclone dust collection apparatus comprising: a first cyclone section, which causes dust containing air to swirl, so that dust is separated from the air and discharged through a lower end thereof, a plurality of cyclone cones arranged on an outer circumference of the first cyclone section, each of which causes the air discharged from the first cyclone section to swirl, so that dust is separated from the air and the air purified thereby is discharged to the lower end thereof, and a top cover joined to the top end of the first cyclone section and having an air inflow duct shaped helically for allowing ambient air to be introduced into the first cyclone section obliquely downward, whereby air is introduced into the upper part of the first cyclone section through the helical air inflow duct and the air purified through the cyclone cones is discharged through the lower end of the cyclone cones.

According to another aspect of the present invention, there is also provided a cyclone dust collection apparatus comprising a cyclone body having a first cyclone section and a plurality of cyclone cones arranged on an outer circumference of the first cyclone section, a top cover joined to the top end of the cyclone body and formed with a helical air inflow duct for introducing ambient air into the first cyclone section; an inflow/outflow guide cover joined to the lower end of the cyclone body so as to communicate the first cyclone section and the plurality of cyclone cones; and a discharge cover joined to the lower part of the inflow/outflow guide cover so as to collect the air discharged through the inflow/outflow guide cover and discharge the collected air to the outside of the cyclone dust collection apparatus.

The plurality of cyclone cones may be approximately symmetrically arranged with reference to the first cyclone section.

In addition, the first cyclone section may include an air outlet formed at the lower end of the cyclone body and the air discharged from the air outlet is introduced into the cyclone cones through the inflow/outflow guide cover.

It is preferable that the air inflow duct has an inlet and an outlet and downwardly slants from the inlet to the outlet. It is also preferable that the air inflow duct is gradually reduced in cross-section from the inlet to the outlet.

The top cover may be removably joined to the cyclone body.

The cyclone body may further comprise a dust collecting chamber, and the dust collecting chamber comprises a first dust collecting chamber for collecting relatively coarse dust separated from air in the first cyclone section and a second dust collecting chamber for collecting relatively fine dust separated from air in the plurality of cyclone cones.

BRIEF DESCRIPTION OF THE DRAWINGS

The above aspects and features of the present invention will be more apparent from the description for certain embodiments of the present invention taken with reference to the accompanying drawings, in which.

DETAILED DESCRIPTION OF THE EXEMPLARY EMBODIMENTS

Hereinbelow, the preferred embodiments of the present invention are described in detail with reference to accompanying drawings.

Figure 1:
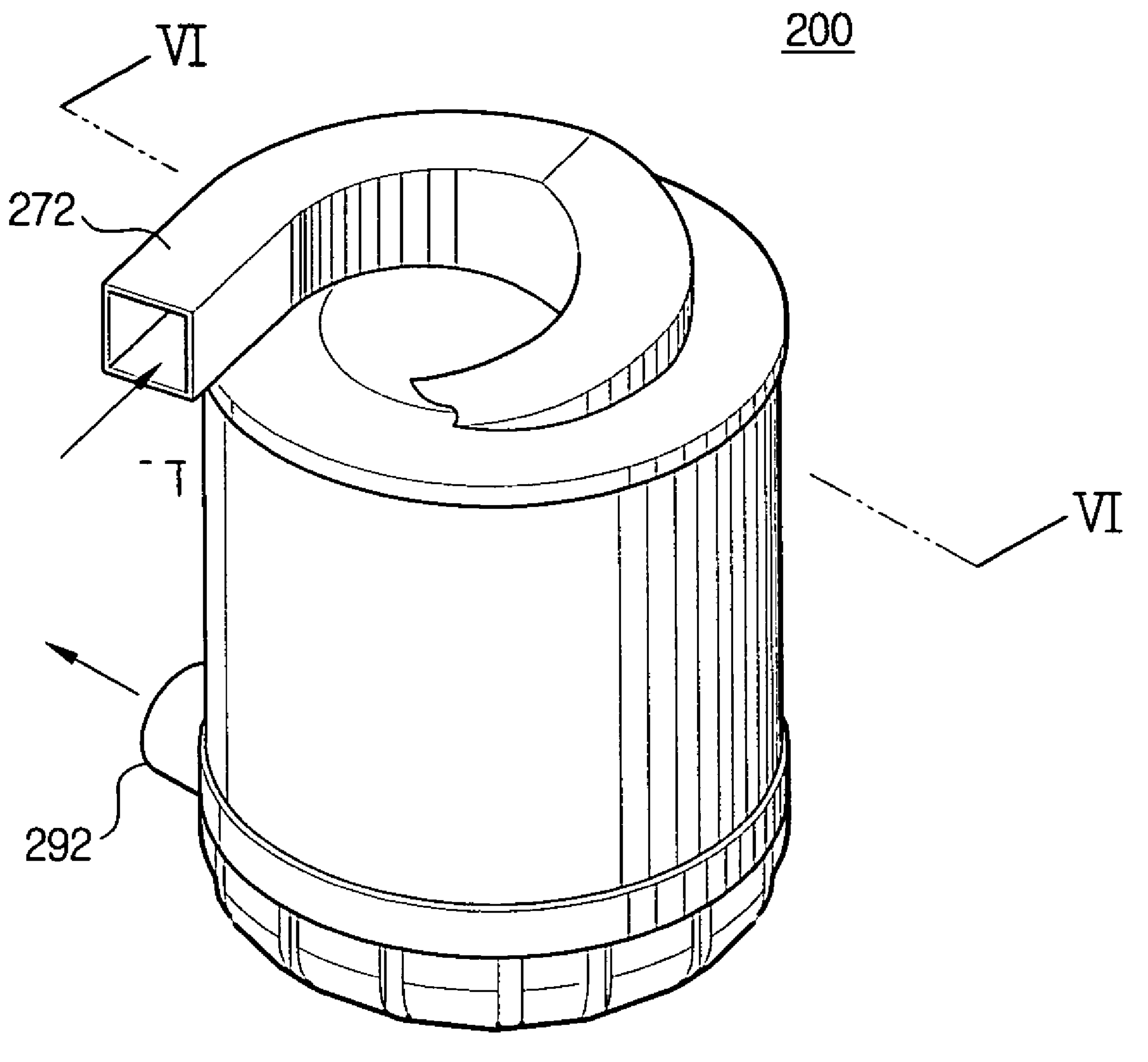
FIG. 1 is a perspective view of a cyclone dust collection apparatus according to an embodiment of the present invention.
Figure 2:
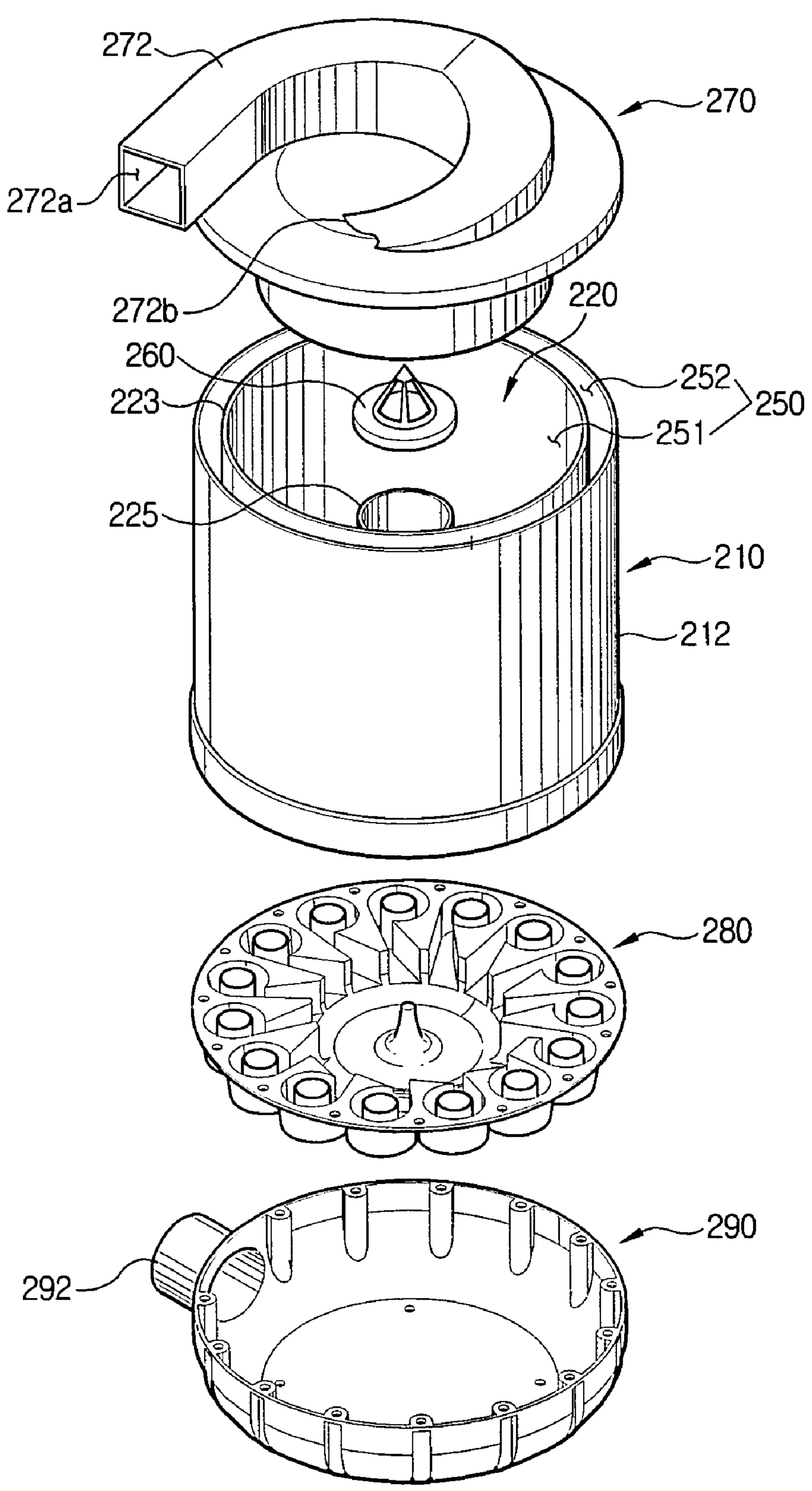
FIG. 2 is an exploded perspective view of the cyclone dust collection apparatus shown in FIG. 1.
Figure 3:
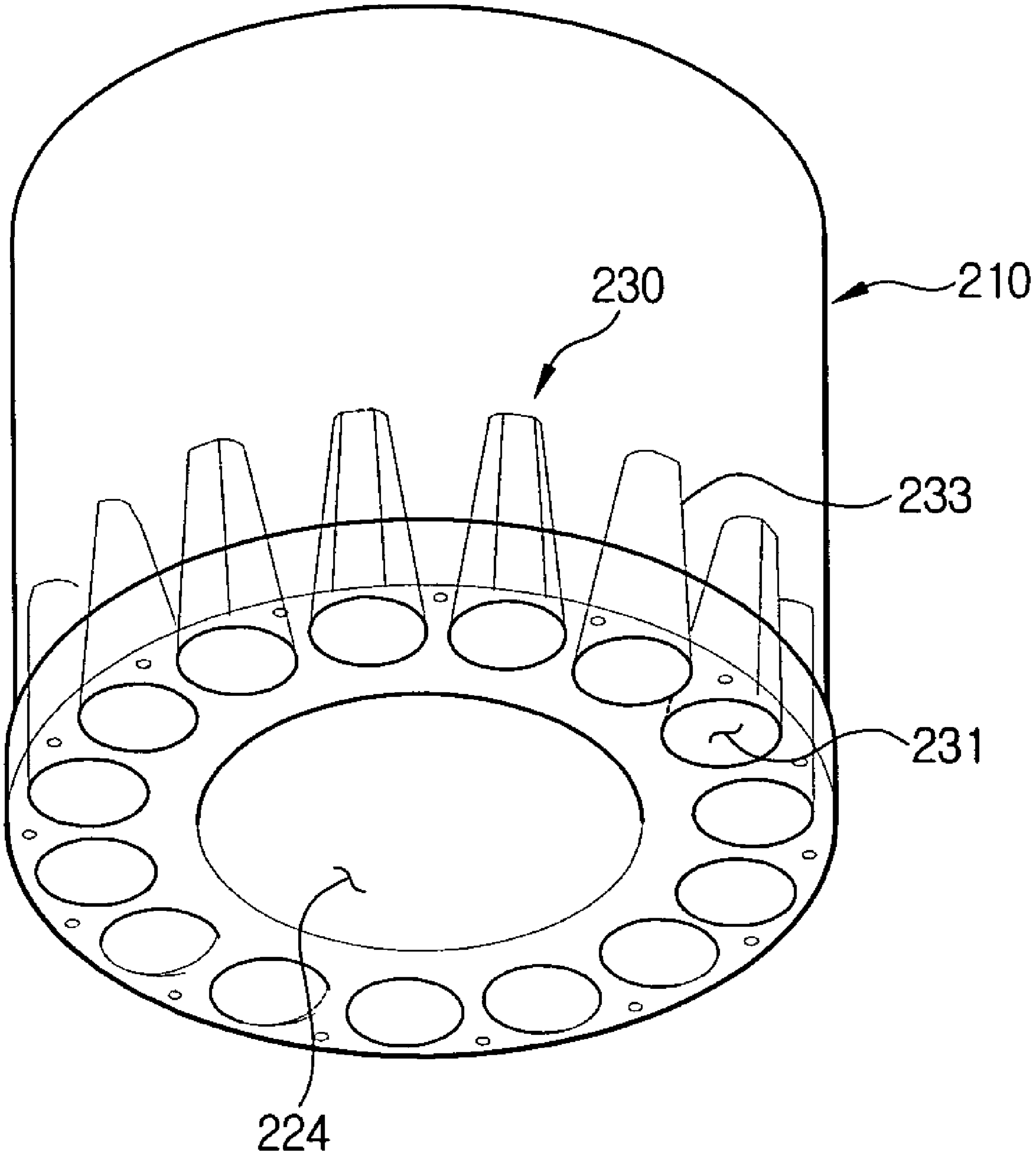
FIG. 3 is a bottom side perspective view of the cyclone body of FIG. 2.

Referring to FIGS. 1 to 3, a cyclone dust collection apparatus 200 comprises a cyclone body 210, a top cover 270, an inflow/outflow guide cover 280, and a discharge cover 290.

Figure 6:
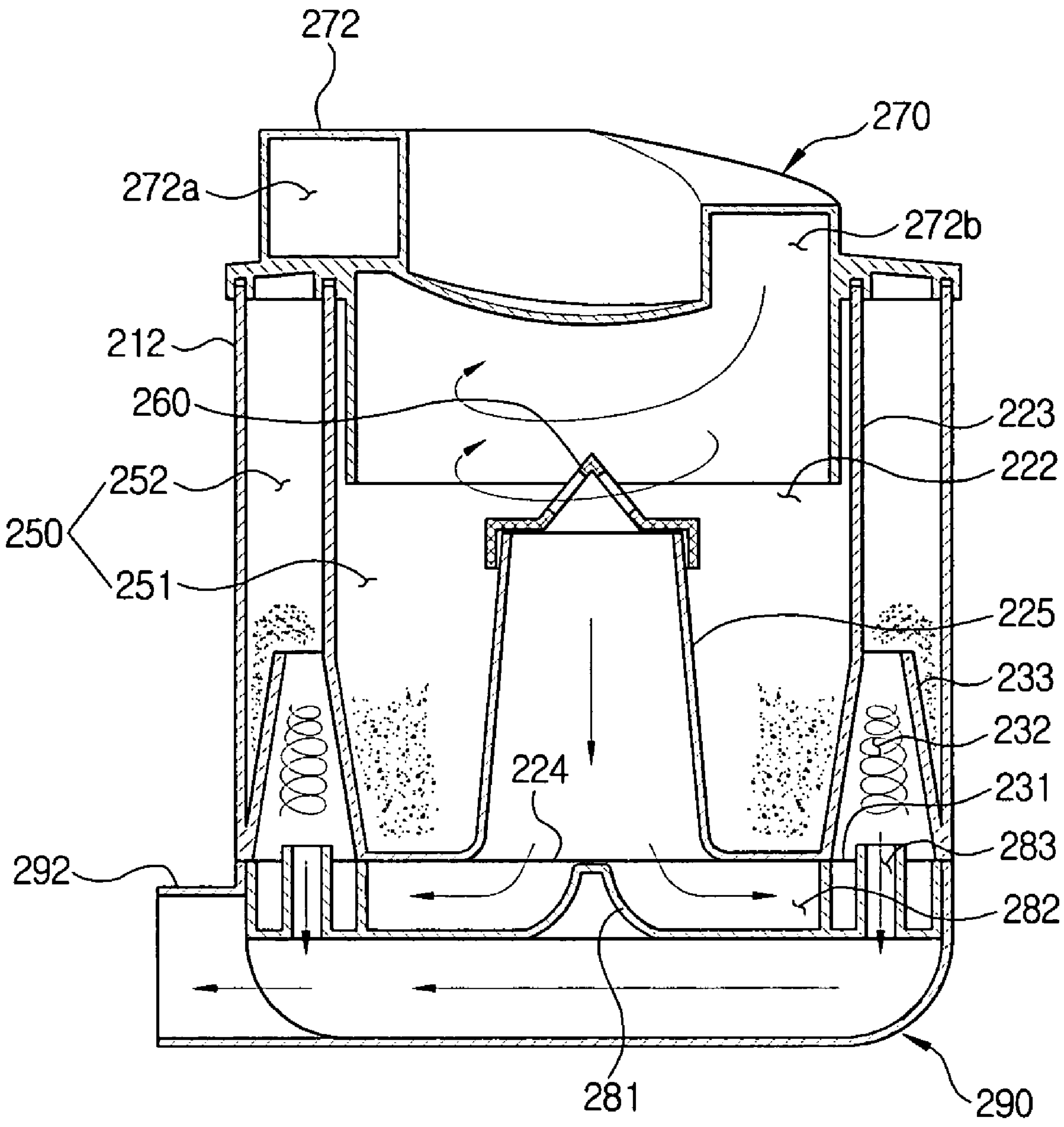
FIG. 6 is a section view taken from line VI-VI of FIG. 1.

The cyclone body 210 causes dust containing air introduced from the outside to form a swirling stream and filters the dust from the air over two steps. Referring to FIGS. 2 and 6, a first cyclone section 220 comprises a first chamber outer wall 223 defining a first cyclone chamber 222, an air outlet 224, and an air discharging pipe 225. The first cyclone chamber 222 causes the dust containing air introduced from an air inflow duct 272 of the top cover 270 to form the swirling stream, thereby separating the air and the dust. The air outlet 224 is formed in lower end of the first cyclone chamber 222, through which the air is discharged after the dust is removed from the air in the first cyclone chamber 222.

The air discharging pipe 225 is perpendicularly extended from the center of the first cyclone chamber 222 by a predetermined height so that it communicates with the air outlet 224. The air, which flows downward and forms the swirling stream in the first cyclone chamber 222, is passed through the air discharging pipe 225 and then discharged through the air outlet 224. A grill member 260 is mounted on the top end of the air discharging pipe 225 so that the dust cannot pass the air discharging pipe 225.

A dust collecting chamber 250 comprises a first dust collecting chamber 251 formed between the air discharging pipe 225 and the first chamber outer wall 223, and a second dust collecting chamber 252 formed between the first chamber outer wall 223 and an outer wall 212 of the cyclone body 210. The first dust collecting chamber 251 collects relatively coarse dust filtered in the first cyclone section 220 and the second dust collecting chamber 252 collects fine dust filtered in a plurality of cyclone cones 230. The first dust collecting chamber 251 and the second dust collecting chamber 252 are defined by the first chamber outer wall 223. The first dust collecting chamber 251 is defined as the space between the air discharging pipe 225 and the first chamber outer wall 223 and the upper part of the space is referred to as the first cyclone chamber, for the sake of convenience of description.

Referring to FIGS. 3 and 6, the plurality of cyclone cones 230 secondarily filter the fine dust contained in the air, which is introduced from the first cyclone section 220. The plurality of cyclone cones 230 are spaced from each other and arranged approximately parallel to each other on the outer circumference of the first cyclone section 220. The cyclone cones 230 are preferably, but not exclusively, the same with each other in size and shape. The plurality of cyclone cones 330 are approximately symmetrically arranged with respect of the center of the first cyclone section 220.

According to this embodiment of the invention, because the first cyclone section 220 has a downwardly discharging construction, i.e., because the first cyclone section 220 is provided with the air outlet 224 at the lower end thereof, the plurality of cyclone cones 230 are also arranged in such a manner that air is introduced through the lower ends of the cyclone cones 230, so as to reduce the air flow path. For this purpose, each of the cyclone cones 230 has an inverse conical shape, i.e., a shape whose diameter is reduced as approaching the top end thereof.

Each of the cyclone cones 230 comprises a cone inlet 231, and a second chamber outer wall 233 defining a second cyclone chamber 232. The cone inlet 231 communicates with the air outlet 224 of the first cyclone section 220 through an inflow guide flow path 282 of the inflow/outflow guide cover 280. In the second cyclone chamber 232, the dust containing air introduced through the cone inlet 231 forms another swirling stream, thereby separating the fine dust from the air.

Referring to FIGS. 2 and 6, the top cover 270 is fitted on the top of the cyclone body 210 and includes the air inflow duct 272 through which the ambient air is introduced into the first cyclone chamber 222. The air inflow duct 272 has a helical structure and is downwardly slanted from an inlet 272$a$ to an outlet 272$b$. In addition, it is preferable that a cross section of the air inflow duct 272 is gradually reduced to the outlet 272$b$ from the inlet 272$a$. In this embodiment, although the air inflow duct 272 is shown as being formed in a rectangular cross section, the invention is not limited thereto. In other words, the air inflow duct may have any different shape such as circular, triangular and semi-circular shapes in cross-section.

Like this, because the air inflow duct 272 has the helical structure slanted downward, the air being introduced into the first cyclone chamber 222 is introduced obliquely downward. Because the air is introduced obliquely downward into the first cyclone chamber 222, the swirling force (centrifugal force) of the dust contained in the air is increased in the top of the first cyclone chamber 222, thereby improving the dust capturing efficiency. In particular, the fine dust capturing efficiency is improved by being highly affected by the initial swirling force, so that an amount of the fine dust moving to the plurality of cyclone cones 230 is small under same conditions. Accordingly, the fine dust is less collected in the inflow guide flow path 282 communicating with the cyclone cones, wherein it is difficult for a user to clean the inflow guide flow path 282 and a connection passage between the first cyclone section and the cyclone cones.

In addition, because the air is introduced obliquely downward in the first cyclone chamber 222 of the first cyclone section 220, the air may not be swirled at the top of the first cyclone chamber 222. Accordingly, the flow path of the dust contained in the air is reduced as compared to the prior art. The dust contained in the air is centrifugally separated from the air and descends due to its weight. In particular, fine dust contained in the air is not easily separated from the air due to very light weight thereof. Accordingly, as the flow path is increased, the fine dust contained in the air is hard to separate from the air.

Additionally, since the cross section of the air inflow duct 272 is gradually reduced, the flow rate of the air introduced into the first cyclone chamber 222 is increased. As the flow rate is increased, the centrifugal force applied to the dust containing air is increased and the amount of the air flowing downward in the first cyclone chamber 222 is also increased, whereby the dust is more easily separated from the air. In other words, the dust collection efficiency is improved.

Figure 4A:
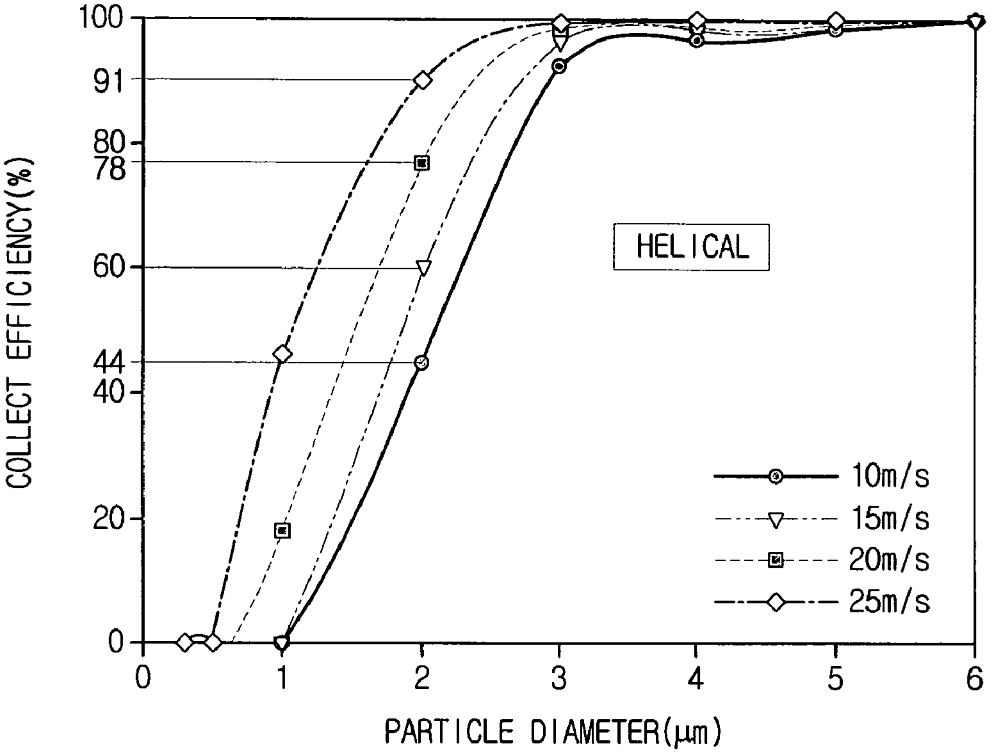
FIGS. 4A and 4B are graphs showing dust collection efficiencies according to air inflow forms.
Figure 4B:
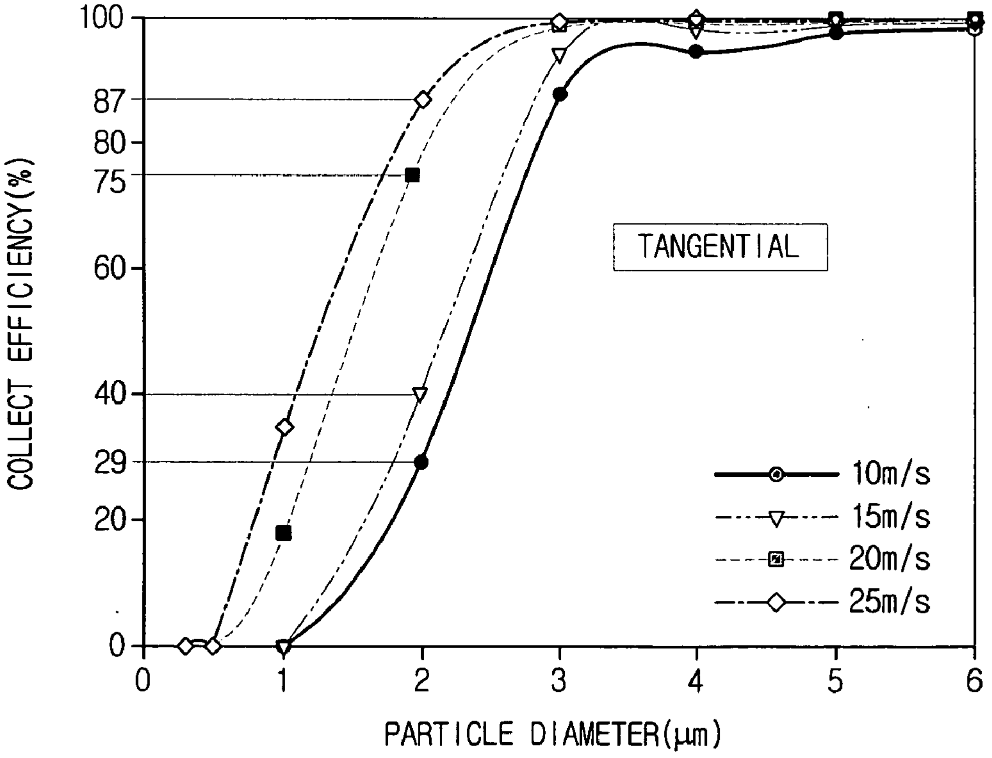

FIG. 4A shows the dust collection efficiencies of the cyclone dust collection apparatus 200 having the air inflow duct 272 shaped helically according to the embodiment of the invention, wherein the dust collection efficiencies were measured through repeated experiments. FIG. 4B shows the dust collection efficiencies of a conventional cyclone dust collection apparatus in which the air is tangentially introduced into the cyclone body 210 from a side of the first cyclone chamber 222. In the experiments, the other constitutional elements except the air inflow duct 272, i.e., the cyclone body 210, the inflow/outflow guide cover 280, the discharge cover 290 and the like are same in specification between the inventive cyclone dust collection apparatus and the conventional cyclone dust collection apparatus.

The ordinate of the graph indicates the dust collection efficiency (%) and the abscissa indicates the particle diameter in micrometers (μm) of dust. According to the experiments, the dust collection efficiencies were measured while variously adjusting the air flow rates. Specifically, the dust collection efficiencies were measured at the air flow rates of 10 m/s, 15 m/s, 20 m/s and 25 m/s. The air flow rates can be variously adjusted by adjusting the power of the driving sources of the dust collection apparatus.

Referring to FIG. 4A, in the cyclone dust collection apparatus 200 employing the helical air inflow duct 272 of the embodiment of the present invention, when the particle diameter of dust is 2 μm, and the air flow rates are 10 m/s, 15 m/s, 20 m/s, and 25 m/s, the dust collection efficiencies are about 44%, 60%, 78% and 91%, respectively. Meanwhile, referring to FIG. 4B, in the cyclone dust collection apparatus in which the air is tangentially introduced, when the particle diameter of dust is 2 μm, and the flow rates are 10 m/s, 15 m/s, 20 m/s and 25 m/s, the dust collection efficiencies are about 29%, 40%, 75% and 87%, respectively. It can be seen that when the helical air inflow duct 272 is applied, the dust collection efficiency is improved even if the particle diameter of dust is 1 μm.

However, when the particle diameter of dust is 3 μm or more, it can be seen that there is little difference between the dust collection efficiencies. This means that the dust is not affected by the length of flow path when dust has a weight exceeding a certain level.

Like this, according to the invention, since ambient air is introduced obliquely downward in the first cyclone chamber 222 by the helical air inflow duct 272, the dust collection efficiency, particularly, the fine dust collection efficiency is improved as compared to a conventional dust collection apparatus in which the air is tangentially introduced.

In addition, in the cyclone dust collection apparatus 200 according to the embodiment of the invention, the top cover 270 is provided with an air inflow duct 272 and the air outlet 224 of the first cyclone chamber 222 is formed in the lower end of the first cyclone chamber 222, whereby it is possible to symmetrically arrange the plurality of cyclone cones 230 around the first cyclone section 220.

Meanwhile, the top cover 270 is detachably fitted on the top of the cyclone body 210. Accordingly, when emptying out the dust as the cleaning is terminated, it is sufficient for a user only to remove the top cover 270 with one hand so as to empty out the dust collected in the dust collecting chamber 250, while fixing the cyclone body 210 with the other hand. Therefore, the work for emptying out dust from the cleaner can be simply and easily performed, thereby improving the user's convenience.

Figure 5:
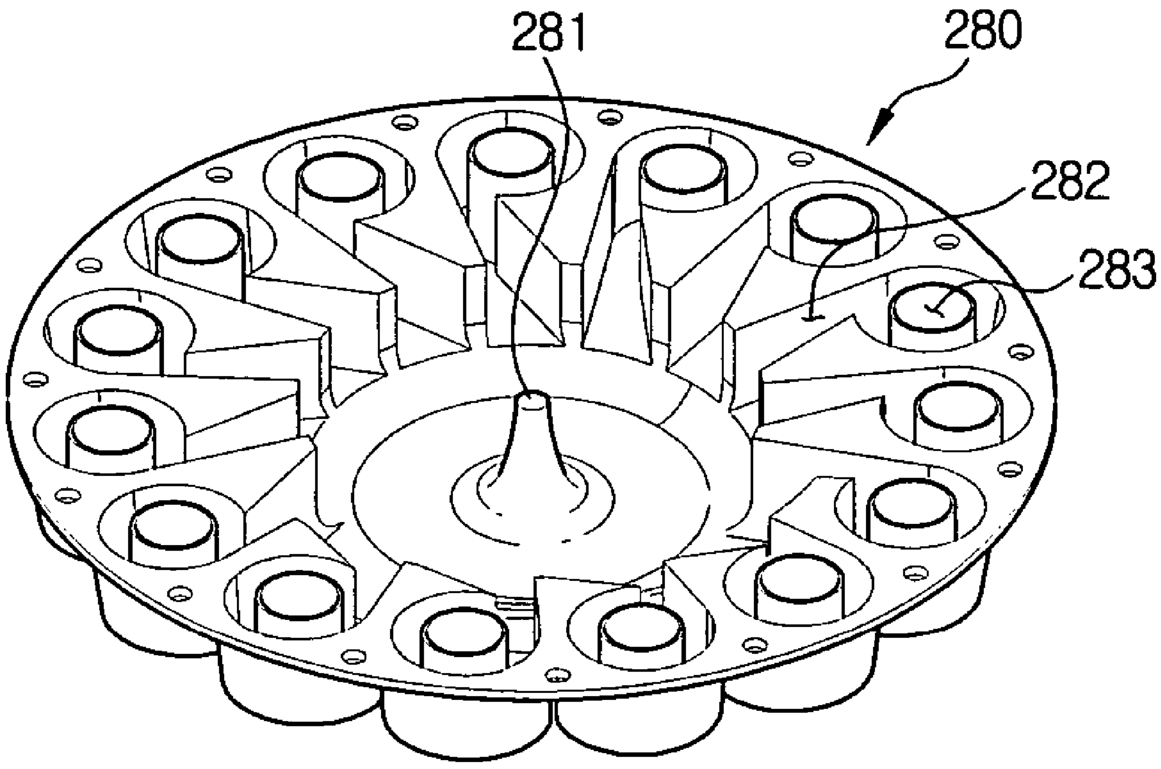
FIG. 5 is an enlarged perspective view of the inflow/outflow guide cover of FIG. 2.

Referring to FIGS. 5 and 6, the inflow/outflow guide cover 280 is connected to the lower end of the cyclone body 210 and comprises a guide cone 281, inflow guide flow paths 282 and discharge guide flow paths 283. The guide cone 281 guides the air discharged from the air outlet 224 of the first cyclone section 220 to be radially spread. The inflow guide flow paths 282 guide the radially spread air to be introduced into each of the cyclone cones 230. Each of the inflow guide flow path 282 has a predetermined width and depth and is helical shaped as approaching the cyclone cone 230. The discharge guide flow paths 283 guide the air separated from the dust in the second cyclone chambers 232 in such a manner as to be discharged. Each of the discharge guide flow path 283 has a circular pipe shape and is inserted into a corresponding second cyclone chamber 232 to such a certain depth that the air introduced through the cone inlets 231 is mixed with the air discharged through the discharge guide flow paths 283.

Referring back to FIG. 2, the discharge cover 290 is joined to the lower part of the inflow/outflow guide cover 280. The discharge cover 290 has a height so as to define a space within the discharge cover 290 and includes an air outflow duct 292 provided at a side thereof. The invention is not limited to the position of the air outflow duct 292. In other words, it is possible to provide the air outflow duct 292 at the center of the bottom of the discharge cover 290. The air discharged from the cyclone cones 230 through the discharge guide flow paths 283 is collected in the discharge cover 290 and then discharged to the exterior of the cyclone dust collection apparatus 200 through the air outflow duct 292. Like this, because the air outflow duct 292 is provided at the lower part of the cyclone dust collection apparatus, if the apparatus is applied to an upright type cleaner, it is possible to reduce the length of the air flow path to a vacuum blower arranged in the lower part of the cleaner, thereby reducing the loss of suction force.

In the mean time, although it is shown and described that the inflow/outflow guide cover 280 and the discharge cover 290 can be separated from each other in the above-mentioned embodiment, the invention is not limited this. In other words, the inflow/outflow guide cover 280 and the discharge cover 290 may be integrally formed.

Hereinafter, the action and function of the cyclone dust collection apparatus having the above-mentioned structure will be described with reference to FIG. 6.

The dust containing air introduced through the air inflow duct 272 is introduced obliquely downward into the first cyclone chamber 222. The air introduced into the first cyclone chamber 222 descends while forming swirling stream. At this time, the relatively coarse dust contained in the air is directed toward the first chamber outer wall 223 due to the centrifugal force and is accumulated in the first dust collecting chamber 251 by the descending air stream. The air passes the grill member 260 and then flows into the air discharging pipe 225.

The air introduced into the air discharging pipe 225 flows out of the air outlet 224 and then the air is radially spread by the guide cone 281 and guided by the inflow guide flow paths 282, thereby being introduced into the cyclone cones 230. The air introduced into the cyclone cones 32 ascends while forming swirling stream in each of the second cyclone chambers 232. At this time, the fine dust contained in the air is concentrated toward the second chamber outer wall 233 and accumulated in the second dust collecting chamber 252 by the ascending air stream. The air descends again after being separated from dust and then the air is discharged through the discharge guide flow paths 283. The air discharged through the respective discharge guide flow paths 283 is collected in the discharge cover 290 and flows out of the cyclone dust collecting apparatus 200 through the air outflow duct 292.

As described above, according to the invention, the fine dust collection efficiency of a first cyclone section of a cyclone dust collection apparatus can be improved because air is introduced into the first cyclone section obliquely downward in a helical form, whereby the fine dusts are less accumulated in air flow paths, which are extended from the first cyclone section to plurality of cyclone cones and difficult to clean.

In addition, as compared to a conventional cyclone dust collection apparatus having an upper discharge structure of the prior art, it is possible to reduce the length of an air flow path for communicating a motor driving chamber provided in a main body of a vacuum cleaner and an air outflow port of a cyclone dust collection apparatus, because the inventive cyclone dust collection apparatus has a lower discharge structure, whereby the loss of suction force of a driving source can be reduced.

Additionally, it is possible to reduce the overall height of a cyclone dust collection apparatus, whereby the cyclone dust collection apparatus can be applied to various cleaners.

Further, the removal of a closure cover is only required so as to empty collected dusts from a cyclone dust collection apparatus, whereby enhancing the user's convenience.

Although representative embodiments of the present invention have been shown and described in order to exemplify the principle of the present invention, the present invention is not limited to the specific embodiments. It will be understood that various modifications and changes can be made by one skilled in the art without departing from the spirit and scope of the invention as defined by the appended claims. Therefore, it shall be considered that such modifications, changes and equivalents thereof are all included within the scope of the present invention.

What is claimed is:

1. A cyclone dust collection apparatus comprising:

a cyclone body having a first cyclone section and a plurality of cyclone cones arranged on an outer circumference of the first cyclone section;

a top cover joined to the top end of the cyclone body and formed with a helical air inflow duct for introducing ambient air into the first cyclone section;

an inflow/outflow guide cover joined to the lower end of the cyclone body so as to communicate the first cyclone section and the plurality of cyclone cones; and a discharge cover joined to the lower part of the inflow/outflow guide cover so as to collect the air discharged from the plurality of cyclone cones through the inflow/outflow guide cover and discharge the collected air to the outside of the cyclone dust collection apparatus.

2. The cyclone dust collection apparatus as claimed in claim 1, wherein the plurality of cyclone cones are approximately symmetrically arranged with reference to the first cyclone section.

3. The cyclone dust collection apparatus as claimed in claim 1, wherein the first cyclone section comprises an air outlet formed at the lower end of the cyclone body and the air discharged from the air outlet is introduced into the plurality of cyclone cones through the inflow/outflow guide cover.

4. The cyclone dust collection apparatus as claimed in claim 1, wherein the helical air inflow duct has an inlet and an outlet and downwardly slants from the inlet to the outlet.

5. The cyclone dust collection apparatus as claimed in claim 4, wherein the helical air inflow duct is gradually reduced in cross-section from the inlet to the outlet.

6. The cyclone dust collection apparatus as claimed in claim 1, wherein the top cover is removably joined to the cyclone body.

7. The cyclone dust collection apparatus as claimed in claim 1, wherein the cyclone body further comprises a first dust collecting chamber for collecting relatively coarse dust separated from the air in the first cyclone section and a second dust collecting chamber for collecting relatively fine dust separated from the air in the plurality of cyclone cones.

8. A cyclone dust collection apparatus comprising:

a first cyclone section, which causes dust containing air to swirl so that dust is separated from the air and discharged through a lower end thereof;

a plurality of cyclone cones arranged on an outer circumference of the first cyclone section, each of which causes the air discharged from the first cyclone section to swirl, so that dust is separated from the air and the air purified thereby is discharged to a lower end thereof; and a top cover joined to a top end of the first cyclone section and having an air inflow duct shaped helically for allowing ambient air to be introduced into the first cyclone section obliquely downward, whereby air is introduced into an upper part of the first cyclone section through the helical air inflow duct and the air purified through the plurality of cyclone cones is discharged through the lower end of the plurality of cyclone cones.

9. The cyclone dust collection apparatus as claimed in claim 8, wherein the air inflow duct has an inlet and an outlet and downwardly slants from the inlet to the outlet, and is gradually reduced in cross-section from the inlet to the outlet.

10. A cyclone dust collection apparatus comprising:

a cyclone body having a first cyclone section and a plurality of cyclone cones being arranged on a lower circumference of the first cyclone section, each of the plurality of cyclone cones having an inverse conical shape with a lower diameter that is reduced approaching a top end thereof; and a top cover joined to a top upper end of the cyclone body and formed with a helical air inflow duct for allowing ambient air to be introduced into the cyclone body obliquely downward.

11. The cyclone dust collection apparatus as claimed in claim 10, wherein the helical air inflow duct has an inlet and an outlet and downwardly slants from the inlet to the outlet, and is gradually reduced in cross-section from the inlet to the outlet.

* * * * *